United States Patent
Hamdane et al.

(10) Patent No.: US 8,560,458 B2
(45) Date of Patent: Oct. 15, 2013

(54) METHOD AND SYSTEM FOR MAKING TRANSACTIONS THROUGH ELECTRONIC PORTABLE DEVICES WHICH CAN BE CONNECTED TO A COMMUNICATION NETWORK, AND ASSOCIATED PORTABLE ELECTRONIC DEVICE

(75) Inventors: Noureddine Hamdane, Arcueil (FR); Roland Le Franc, Paris (FR)

(73) Assignee: Archos, Igny (FR)

( * ) Notice: Subject to any disclaimer, the term of this patent is extended or adjusted under 35 U.S.C. 154(b) by 1323 days.

(21) Appl. No.: 11/708,564

(22) Filed: Feb. 21, 2007

(65) Prior Publication Data

US 2008/0114694 A1    May 15, 2008

Related U.S. Application Data (60) Provisional application No. 60/858,950, filed on Nov. 15, 2006.

(30) Foreign Application Priority Data

Nov. 10, 2006   (FR) ...................................... 06 09856

(51) Int. Cl.
    *G06Q 20/00*   (2012.01)
(52) U.S. Cl.
    USPC .............................. 705/75; 705/14.23; 705/25
(58) Field of Classification Search
    USPC .......................................... 705/25, 14.23, 75
    See application file for complete search history.

(56) References Cited

U.S. PATENT DOCUMENTS

| | | | | |
|---|---|---|---|---|
| 5,796,401 | A | * | 8/1998 | Winer .......................... 345/619 |
| 6,028,585 | A | * | 2/2000 | Ishii et al. ..................... 345/581 |
| 6,694,387 | B2 | * | 2/2004 | Wagner .......................... 710/33 |
| 7,003,793 | B2 | * | 2/2006 | Hwang et al. ................... 725/91 |
| 7,562,219 | B2 | * | 7/2009 | Lazaridis et al. ............. 713/168 |
| 2001/0044787 | A1 | * | 11/2001 | Shwartz et al. ................. 705/78 |
| 2002/0042722 | A1 | * | 4/2002 | Tsuji et al. ....................... 705/1 |
| 2002/0126780 | A1 | * | 9/2002 | Oshima et al. ................ 375/347 |
| 2002/0131598 | A1 | * | 9/2002 | Chiu ............................. 380/270 |
| 2002/0194081 | A1 | * | 12/2002 | Perkowski ...................... 705/26 |
| 2003/0032409 | A1 | * | 2/2003 | Hutcheson et al. ........... 455/414 |
| 2003/0080996 | A1 | | 5/2003 | Lavin et al. |

(Continued)

FOREIGN PATENT DOCUMENTS

| | | |
|---|---|---|
| WO | 98/36344 | 8/1998 |
| WO | 0039666 | 7/2000 |

(Continued)

OTHER PUBLICATIONS

Opera mini 2.0, http://www.opera.com, Oct. 16, 2006 [retrieved Oct. 7, 2009].*

(Continued)

*Primary Examiner* — Calvin Cheung
(74) *Attorney, Agent, or Firm* — Young & Thompson (57) ABSTRACT

A method and system for making transactions with at least one merchant site through an electronic portable device which can be connected to a communication network, comprising a connection of an electronic device to an intermediary site through the communication network. The said intermediary site being connectable to at least one merchant site, and a transmission to the said electronic portable device of information coming from at least one merchant site in a format which is adapted to the resources of the said electronic portable device.

38 Claims, 6 Drawing Sheets

(56) References Cited

U.S. PATENT DOCUMENTS

| | | |
|---|---|---|
| 2003/0135561 A1 | 7/2003 | Bodin et al. |
| 2004/0148307 A1* | 7/2004 | Rempell .................. 707/102 |
| 2005/0004875 A1* | 1/2005 | Kontio et al. ................ 705/52 |
| 2005/0094205 A1* | 5/2005 | Lo et al. .................. 358/1.18 |
| 2006/0268100 A1* | 11/2006 | Karukka et al. .......... 348/14.01 |

FOREIGN PATENT DOCUMENTS

| | | |
|---|---|---|
| WO | 01/39039 | 5/2001 |
| WO | WO01/86462 A1 * | 11/2001 |
| WO | 03/007172 | 1/2003 |

OTHER PUBLICATIONS

Varshney, U.; Vetter, R., A framework for the emerging mobile commerce applications, System Sciences, 2001. Proceedings of the 34th Annual Hawaii International Conference on Jan. 3-6, 2001 p. 10 pp.*

Layton, J., Brian, M., Tyson, J. How Cell Phones Work, Nov. 25, 2005 [retrieved Oct. 8, 2009].*

Google search string "electronic business extensible markup language" on Jun. 28, 2010.*

Google search string "electronic commerce extensible markup language" on Jun. 29, 2010.*

Google search string "handheld device markup language" on Jun. 28, 2010.*

"HDML 2.0 FAQ." Apr. 11, 1997. All pages. http://www.w3.org/TR/NOTE-Submission-HDML-FAQ.html.*

Google search string "wireless device markup language" on Jun. 28, 2010.*

Google search string "wireless markup language" on Jun. 28, 2010.*

"Wireless Markup Language." Wikipedia. Oct. 8, 2005. All pages. Retrieved Jun. 28, 2010 via Wayback Machine. http://web.archive.org/web/20051008180336/http://en.wikipedia.org/wiki/Wireless_Markup_Language.*

"Wireless Markup Language version 2.0." Sep. 11, 2001. All pages. http://www.wapforum.org.*

William Strunk Jr., and E.B. White, "The Elements of Style", $3^{rd}$ Edition, Macmillan Publishing Co., Inc., all pages, 1979.*

European Search Report dated May 14, 2008 from EP07291345.

* cited by examiner

METHOD AND SYSTEM FOR MAKING TRANSACTIONS THROUGH ELECTRONIC PORTABLE DEVICES WHICH CAN BE CONNECTED TO A COMMUNICATION NETWORK, AND ASSOCIATED PORTABLE ELECTRONIC DEVICE

TECHNICAL FIELD

The present invention relates to a method for making transactions through portable electronic devices which can be connected to a communication network. It also relates to a system implementing this process, as well as an associated electronic portable device.

It relates to offering the users of portable electronic devices which can be connected to the Internet the possibilities of on-line purchasing of goods and/or services similar to those available to the users of on-line computers.

BACKGROUND OF THE INVENTION

On-line merchant sites on the Internet are known, offering material or immaterial goods or services. These sites and the means that they use have been optimized for potential clients using a computer as a means for accessing offers, carrying out transactions and optionally to receive the object of the transaction when it is for example musical or audiovisual content. Moreover, the traditional on-line merchant sites offer in a single entity the management of the presentation of the offer, the transaction, invoicing, and delivery of the goods or services.

Moreover solutions are known such as "Opera mini" which enable any web pages to be browsed from portable devices such as new generation mobile phones.

Solutions are also known such as those described in U.S. Pat. No. 7,003,793 for offering video on demand on portable terminals via wireless telecommunications infrastructures.

State of the art solutions raise a number of problems, such as browsing within an offer where the presentation has been designed to be viewed on a large screen with interactivity relying on sophisticated and precise means such as for example a mouse. Viewing pages rich in information on small-size screens, even where they have good resolution and are touch-sensitive, remains problematic. Moreover the web pages presented on merchant sites increasingly include animated objects or video to make them attractive, for example using "Macromedia/Adobe" flash and/or flash video solutions. Reproduction of these animated objects is problematic on low-cost and/or low power technical platforms having limited resources and/or processing capabilities both in terms of reproduction means and computing power. Moreover, the procedures implemented to perform secure transactions generally rely on substantially proprietary solutions or also are associated with a computer operating system such as those of Microsoft or Apple which are impossible to implement in portable electronic equipment which is low cost and/or relies on other operating systems. Finally, the only viable solutions in the state of the art rely on the vertical integration of the whole procedure from the e-commerce platform to the supply of the solutions to access it, in the form of hardware and/or software. Nevertheless, the vertical solutions present potential security weaknesses in that they rely in part on the running of programs on end user's computer that are not controlled by the client terminal. Solutions enabling web pages to be browsed from portable electronic devices such as mobile phones after sifting and compression of standard web pages are not sufficiently ergonomic to satisfy the requirements of on-line commerce which simultaneously requires quality of service, security, attractiveness to clients and ease of use. Automatic conversion solutions such as "Opera mini" are attractive in theory due to the universality of the ability to browse the internet as a whole. However in practice these solutions cannot be implemented for e-commerce, as they do not offer the required characteristics detailed above.

SUMMARY OF THE INVENTION

The invention aims to solve at least a part of the problems attached to the prior art solutions. In addition it brings to existing merchant sites at reasonable conditions, one more sales channel based on the use of portable electronic devices.

These problems are solved with a method for making transactions with at least one site supplying products and/or services through a plurality of portable electronic devices which can be connected to a communication network, each of said portable electronic devices controlling internal or external displaying, browsing and/or selection resources, said method comprising:

connecting an electronic device among said plurality of electronic devices to an intermediary site via said communication network; and transmitting information provided by said at least one products and/or services supplying site, directly or through said intermediary site to said portable electronic device, in a format adapted to said controlled resources for said portable electronic device.

The three-part structure on which the invention is based is presented in the form of a plurality of electronic devices accessing at least one merchant site via an intermediary site for the sake of clarity of the description. Nevertheless, the invention can be implemented in different forms without exceeding its scope. For example the so-called merchant sites can themselves be aggregators for third-party offers, they can also be commercial front-ends offering goods or services provided by third parties.

Similarly the portable electronic devices can represent a population of heterogeneous equipment conforming to different standards and which may require additional adaptation or conversion processes within the intermediary site in order to make the means for providing the services uniform. The means used to implement the intermediary site according to the invention can also be used to host a merchant site and vice versa.

The invention also resolves the problem of adaptation of the presentation of the offer of goods and/or services to the limited means of interaction with the user provided by portable devices. The invention also provides the support for commercial transactions, and optionally participates in the management of the rights associated with the goods or services if appropriate.

Another advantage of the invention consists in the capacity of the intermediary site to reinforce the confidence and the security for all of the parties involved. The client no longer needs to fear a loss of confidentiality in relation to his personal data associated with the running of silent programs transmitted by the merchant site to his terminal or to fear the introduction of viruses or other "spyware" by this means into his system. Moreover, the invention is advantageously associated with the use of secure means of communication between the parties involved capable of exchanging sensitive information. Thus the exchanges between the merchant sites and the intermediary site are encrypted for example using secure links such as https. The intermediary site is advantageously associated with an IP address or with a plurality of fixed IP addresses known to these correspondents and therefore can be verified. In the invention the management of certificates is also envisaged which guarantee the merchant sites that the remote client is indeed using an official, known, identified and/or trusted device.

For their part, the merchant sites benefit from a more advanced identification and traceability than in the traditional on-line sales systems. The system according to the invention reinforces the degree of confidence in the system with respect to the partner merchant sites in particular for services which the intermediary site can procure. It can for example involve providing each merchant site with a rating of the degree of confidence associated with the clients, based on a mutual storage of past transactions and/or of any incident which may have arisen with other suppliers.

The intermediary site can also offer ancillary functions for reinforcing general security by the addition of functionalities based on the knowledge of a unique code associated with the product. It may be for example an ability to block the operation of a device by introducing an appropriate command when there is communication between the intermediary site and this device. The blocking command can also be included in a content downloaded in an indirect manner from the intermediary site, for example by means of a computer. The remote blocking of the operation of a device can be activated by the intermediary site at the request of a merchant site for example as the result of a payment problem. The blocking can follow a declaration of loss or theft of the device from its registered owner.

The blocking request can also be made by a third party supplying an insurance service to the owner. Advantageously, at each new connection, the intermediary site compares the identifier of the device to the identifiers contained in a file dedicated to the devices to be blocked and transmits the blocking command to the device concerned in the case of identity with one of the identifiers of the file. Of course, means are provided for unblocking the operation of the device and for restoring the user's rights. These may be remote unblocking solutions or unblocking solutions requiring physical intervention on the device at an approved centre.

It is also possible to reduce only partially the functionalities of the device and/or the field of the services which it can access. The first level of action possible relates to the blocking of the possibility of acquiring goods and/or services according to the invention. This action offers the advantage of being able to be taken within the intermediary site itself and of not requiring the participation of the portable electronic devices.

The unique device code can also be used in the context of a marking of the content files acquired by a client with a digital watermarking or fingerprinting in order to ensure their traceability if necessary.

Of course all the aspects of the method relating to the payment or to the attribution of the service use encryption means according to the state of the art.

The method according to the invention is characterized in that it comprises the following stages:
- Connection of an electronic client device to the on-line "shopping centre" hosted by said intermediary site, optionally identification and/or authentication of the device and/or of the client at the connection stage,
- Presentation in response to the client device of a general offer being able to incorporate direct offers and third party offers with an ergonomics suited to the resources of the device,
- Browsing the direct offers or the indirect offers proposed in the space,
- Selection of one or more objects with possible free sampling,
- Transaction after prior authentication of the client device and/or authentication of the client himself,
- Delivery to the specified location or locations.

Delivery to the specified location or locations can be carried out or organized directly by the supplier site or also be organized or carried out by the intermediary site without exceeding the scope of the invention. Similarly, the scope of the invention is not exceeded if the adaptation to the characteristics of the portable electronic device and/or the transmission of this information is/are carried out by a supplier site.

Advantageously the portable electronic device can include a screen icon or a dedicated physical button for connecting directly to the on-line "shopping centre".

The intermediary site, in the services that it offers, is more like an on-line "shopping centre" than a traditional merchant site in that it potentially combines several "signs" for partner merchant sites in the one shared initial space. In a first embodiment each partner merchant site is responsible for its own financial transactions. In another embodiment, the intermediary site according to the invention offers the client a "central check out" that is to say a system for management of the commercial transactions common to all the partner signs.

When the subject of the sale is an intellectual work subject to rights and which can be delivered by downloading, the digital content is generally encrypted before being transferred and can only be used on a device having an appropriate licence.

The offer, in the sense of the invention can relate either to material objects, permanent immaterial objects such as files with content subject to the copyright regulations, protected or otherwise, delivered by downloading for example written or spoken works, music, still frames or video. It can be the same immaterial objects but delivered for direct consumption without long-term storage. This category includes all the forms of streaming of music, spoken or played audio works and radio transmissions optionally enriched with still frames or video.

The presentation in response to the offer to the client device can be carried out in a format adapted to the resources of the device in particular to the size, the format and the resolution of its screen. This adaptation can also relate to the browsing and selection means used in the device. One of the main advantages of the choice of partner merchant sites compared to the provision of an open access to all the merchant sites on the web is that the pages presented can be adapted perfectly to the resources of the portable electronic device. The adaptation (means for adapting information) is not expensive for the partner merchant site in that it provides the intermediary site with access to the partner's catalogue in the form of a file or a flow of information structured according to a standard for example XML which generally exists as a framework for its own main site. It can however be necessary to carry out adaptations for example by adapting the interpretation of certain information tags or fields. The on-line commercial tools for carrying out the transaction generally rely on the execution of a program transmitted on the client's platform. It can for example be the execution of an ActiveX module in the Microsoft universe or also a Java applet.

The low-cost and/or low power portable electronic client devices which are the subject of the invention do not generally have the technological resources which would make it possible to run this software as a computer would and this is why, in the preferred embodiment of the invention, the programs transmitted by the merchant sites, normally intended to be run on the client terminals are run in the server of said intermediary site. This variant embodiment allows the system according to the invention to carry out transactions with any merchant site connected to the Internet/www.

It is however possible to simplify the handling of the transactions when the merchant site is known to the intermediary site, for example, in the context of a partnership. In fact, in this case the intermediary site can directly provide the information which the merchant site requires in order to carry out the transaction without having to receive and run a specific program. This occurs by one or more transmissions of information on the Internet/www according to state of the art techniques by the client and supplier sites (web services).

Once the transaction has been finalized between the intermediary site and the merchant site, the latter can undertake delivery directly to the client or clients concerned. The details of the client or clients are transmitted by the intermediary site to the merchant site. The nature of the details transmitted depends on the nature of the object to be delivered. It can be postal details if it is material goods or addresses in the network if it is goods in digital format which can be delivered by downloading. The same transaction can generate several deliveries to the same client and/or to different clients. A transaction can also be intended for one or more physical addresses or addresses of devices in the network other than the address normally associated with the client's account, for example, in the context of offers of gifts to third parties, group purchases etc.

The intermediary site according to the invention comprises a database or several databases which are optionally interconnected. A database in the intermediary site associates the standard client account information with the address in the network and/or with a unique identification code of the device or the devices concerned. The standard client account information includes the elements for identification of the client and the information required for the payment.

The system according to the invention allows a huge choice of application with regard to the offers proposed, their storage location and the path that the corresponding information takes in order to reach the user. Thus a portable electronic device which connects to the intermediary site can receive offers either hosted by the intermediary site, hosted by a supplier site and passing through the intermediary site or sent directly to the electronic device by the supplier site without passing through the intermediary site. It is also possible to switch from one hosting location method to the other during the browsing in the space of the offers accessible from the portable electronic device without exceeding the scope of the invention.

The system according to the invention also allows a huge choice of application with regard to the management of the payment associated to buying transactions. It is possible to locate the knowledge of the payment information in the portable electronic device which could for example incorporate means for reading an electronic payment means or means for entering payment information such as a bank card details.

The payment information can advantageously be stored in the intermediary site. The payment information can also remain in the information system of the partner merchant sites or also be stored in a specialised site outside the system according to the invention for example with a trusted third party. No matter what the choice of location of the payment information is, this still lies within the scope of the invention. This choice has implications in terms of security and choice of the technical means used. The payment information must be kept in protected storage means and the transmission means used for transmitting this information must be encrypted end-to-end according to the techniques of the state of the art. In the case where the payment information does not originate from the portable device, identification/authentication information, encrypted or not, is sent by this device to the intermediary site.

In the case that the intermediary site does not contain the payment information, it sends client identification/authentication information to the merchant site.

In an embodiment in which a dedicated external site is used in order to store the payment information, then the client identification/authentication information must be transmitted to it. The external site then undertakes to transmit, on its own responsibility, the client payment information to the merchant site using secure means according to the state of the art. The client identification/authentication information can be identical from end-to-end but it can also be different and only have one-to-one correspondence for example by means of association mechanisms in databases. Advantageously, and particularly in the case where the transmissions of said client identification/authentication information use means which are not very secure, an additional control procedure is used when validating the transaction. To this end, the client may be asked to enter an additional code such as for example the three-digit code recorded on the back of bank cards.

In the preferred embodiment of the invention, the intermediary site allows the client to store his bank details in order to facilitate his subsequent transactions. The client has the opportunity to refuse this facility. He must then provide this information himself at each transaction. Even in the absence of direct or indirect storage of bank details the intermediary site facilitates the transactions by storing other information such as for example the names of the client and the recipient, delivery addresses, identifiers of portable electronic devices. This information is advantageously part of a profile summary proposed to the client for acceptance, for selecting from a list if there are several items of information of the same type recorded previously or for modification by the intermediary site before sending of the information in the format suited to the merchant site or to the plurality of merchant sites if appropriate.

In the embodiments of the invention where the client has been previously authenticated, according to the level of confidence that can be assigned to this authentication and to the transmission link that the information passes through, the transaction can be validated by entering a simplified code, by the recognition of information, by a graphical signature in the case of a touch screen. At least one biometric information associated to the client can advantageously be used, for example a voice and/or finger print, face recognition . . . . Of course, the corresponding sensors and processes have to be implemented in the device.

Another advantageous provision relating to the implementation of the invention is the synchronization of the client identification/authentication information and the confirmation/validation solutions for facilitating the processing in the case of purchases coming from multiple merchant sites within the same client session/transaction. In the event that synchronization is impossible, the intermediary site can nevertheless consolidate the purchases for each merchant site by providing it with the information specific to it from a database which contains it in combination with the unique client identification/authentication information originating from the portable electronic device. The intermediary site can also consolidate possible different confirmation/validation means.

Advantageously the database can store characteristics of the purchases made previously and/or of the pages visited. This information can be used in order to establish a profile of preferences which can be used in the context of targeted promotional offers, contextual presentation of offers, targeted publicity, questionnaires and other opinion polls, loyalty programs, sources of revenue by valorization of the information collected, etc.

The intermediary site contains a support database for the presentation of the available offer aggregating offers of different origins including offers originating from partner merchant sites.

The information proposed is adapted to the recipient device, for example to a portable multimedia player PMP, a portable multimedia assistant PMA, a portable digital assistant PDA, a mobile telephone, a games console or a computer.

The adaptation can advantageously encompass an optimization as a function of the size of the screen and its format, its resolution and/or the browsing means and associated selection tools. The information presented can also be subject to a filtering as a function of technical criteria, legal criteria or also as a function of the type of support targeted. For example in the case of the sale of videos-on-demand, the catalogue offered can be differentiated as a function of the embedded means for decoding and/or protection, for example for decryption, or also depending on the rights associated with the works with regards to the method of use for example for permanent storage, for a display for immediate use, for a display during a progressive download, for a display on a television, for a display while on the move on a portable device, etc.

The adaptation can also take place in the space of the choices of merchant sites or also in the space of the offers proposed by a given merchant site as a function of criteria associated with the client such as for example his location/nationality.

One of the most important elements in the perceived quality of the service offered is the dynamics of the interactivity. Users are used to a smooth and responsive browsing when they buy on-line using their computer connected to the Internet/www via broadband means. It is necessary to replicate as much as possible the responsiveness which users are accustomed to by using means which do not allow this naturally. The invention makes it possible to substantially improve the responsiveness of the system for carrying out transactions compared with the solutions according to the state of the art. This relies on the implementation in the intermediary site of all or part of the functional refinements described below. The flows originating from the standard merchant sites are optimized for computers and integrate additional objects such as images, sound, animation and/or video. The intermediary site can withdraw objects which are incompatible with the reading means of the portable electronic device. There may be an advantage to withdrawing objects which are not indispensable in order to reduce the quantities of information to be transmitted which in the end leads to an improvement in the responsiveness of the system. The intermediary site can also convert objects from an incompatible format into a compatible format or from a compatible but not very effective format into a more effective compatible format. The commercial offers are almost systematically associated with images displayed in the form of small size vignettes on the screens. The object which appears as a small size image on the user's screen after intervention by the browsing software generally correspond to a file containing a quantity of information much larger than required. Without changing any other thing, it is possible to substantially reduce the volume of the information transmitted by transferring image files the size of which corresponds exactly or approximately to the resolution necessary for a correct display taking account of the relative size of the image on the screen and of the size of the screen and its resolution.

In order to reduce the response times during browsing and to allow the user to anticipate his browsing/selection actions, advantageously it will be chosen to transfer the content of the screens a whole page at a time with a display with progressive resolution. This arrangement will advantageously be completed by stopping the transfer in the middle of a page once an action by the user on a browsing/selection control is detected.

Other improvements aiming to make the system more responsive can be implemented. This may be for example browsing means adapted to page-by-page browsing. The intermediary site preferably integrates temporary storage capacities called cache memories in order to speed up access to the most frequently consulted pages. This temporary local memory can be placed in front and/or at back of the intermediary site in order to limit the volumes of information to be received from the merchant sites concerned. It is also possible to place temporary memory downstream from the intermediary site in order to store the pages most often called up by the portable electronic devices, which have undergone all or part of the adaptation processing according to the invention. The temporary storage within the intermediary site can concern only a part of the information flows to be managed for example the image files or other large-volume multimedia objects called up within the offers pages to be transmitted to the portable electronic devices.

The objective of improving the dynamics of browsing can also rely on the transmission of each page in two goes, firstly the architecture of the page including sufficient textual information in each selectable object and/or illustrating the context of the choice then secondly the images and other non-essential decorative elements or multimedia accompaniment elements. Thus the user can browse more rapidly towards the object of his search and saves time in the intermediate stages.

DESCRIPTION OF PREFERRED EMBODIMENTS

Figure 1:
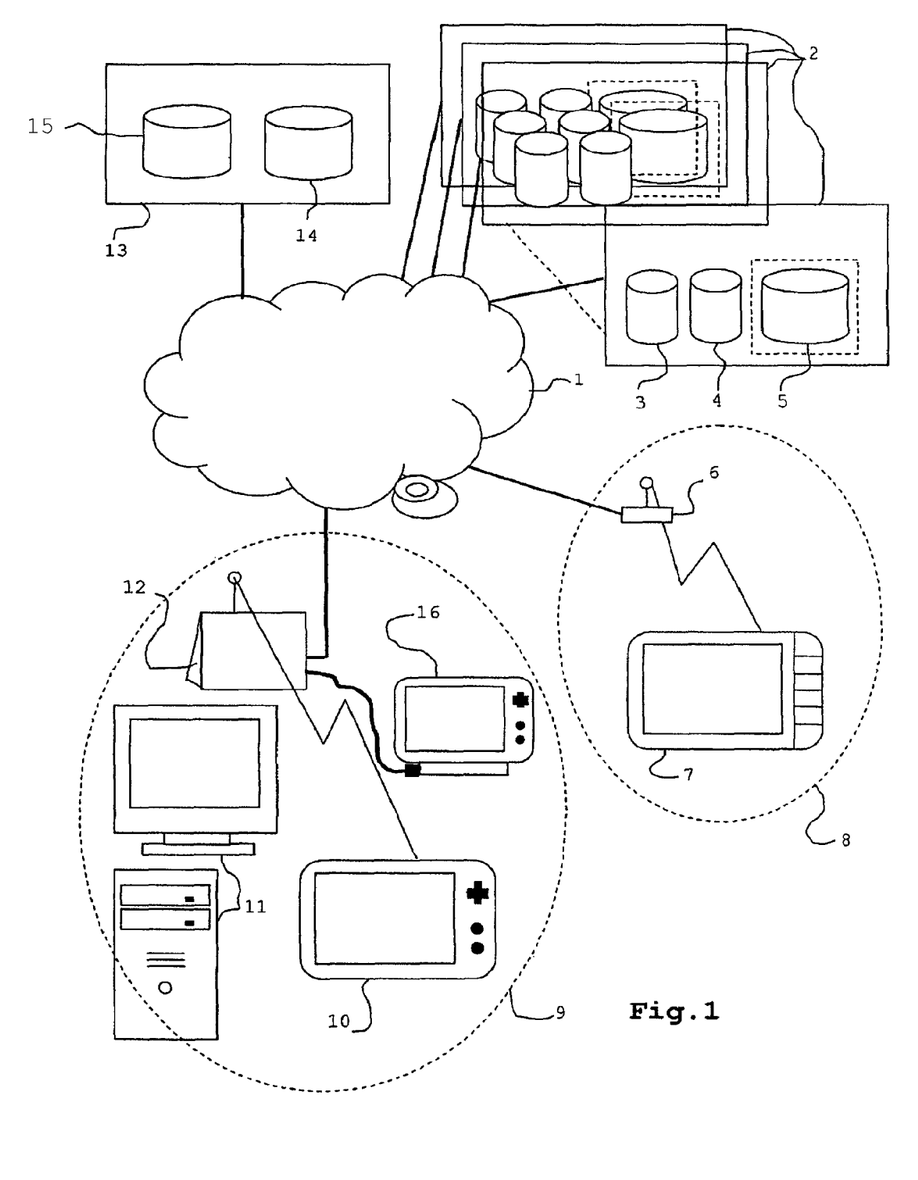
FIG. 1 illustrates the architecture of a transaction system according to the invention.

With reference to FIG. 1, partner merchant sites, the content of which can be incorporated by the intermediary site, have a standard architecture the development of which follows that of the computer tools on the market. Conventionally, a merchant site 2 contains a catalogue database 3, a client database 4 and in the case of the sales of digital audio and/or video objects, a database of protected content 5.

These databases, separated for clarity of the description, can be partially or totally combined without exceeding the scope of the invention. Moreover, in the case of the sale of digital audio and/or video objects, the object of the transaction and the delivery can be merely the user licence. The client may in fact already have in his possession the protected digital content which he cannot use without the corresponding licence. It is completely possible to separate the means for distributing the protected digital content and the means for using them. The encrypted content can be broadcast on a large scale by inexpensive means such as by systems for digital remote broadcasting or transmission or also by means of physical media. The invention is still an advantageous solution In such a context, the object of the transaction and delivery is then the appropriate license or licenses.

In the preferred embodiment of the invention, a new client account is created after filling in a certain number of information fields during a so-called registration session of the new client and/or of the new product using a computer. However the scope of the invention is not exceeded in those cases where the creation of a new account takes place directly from the portable electronic device or requires any other specific initial action optionally involving other devices such as computers, specific terminals, telephone, etc. Specific initial actions can also be necessary in the context of certain methods for management of the rights used in order to exploit protected audio and/or video content bought on-line.

The partner merchant sites tend to be optimized for the greatest number of terminal equipment, typically microcomputers. This continuous enrichment of the web site contents enlarges the gap between the computational power needed to achieve a good user experience and the capabilities of portable devices.

The main role of the intermediary site is to continuously adapt the offers of these sites, which are increasingly sophisticated, to the constraints and limited resources of the portable electronic devices which can be connected to the Internet by hard-wired or wireless means according to the invention. This adaptation essentially relates to the means for reproduction, browsing and selection of the objects in the space of the offers but it can also relate to the offer of content itself.

It is possible to define a standard level of adaptation which can be more or less suitable for most portable electronic devices. This method of adaptation by default may for example involve withdrawing the objects which have a too large volume or are not supported or also for example optionally reducing the size of certain images. However the adaptation can be optimized as a function of the characteristics of the connected electronic devices in order to improve the quality of service received.

In a particularly effective embodiment of the invention, a portable electronic device, which is connected to the intermediary site, associates its request for connection with the provision of an identifier and/or an explicit descriptor of its characteristics for example by indicating the number of lines and the number of columns displayed, optionally the size of the diagonal of the screen and/or its format. The information describing the resources advantageously includes the list of the supported formats and/or the decoding means and/or decryption means which are embedded. The description of the resources of the portable electronic device can also be implicit in that the intermediary site can obtain the corresponding information by interrogating a database using the identifier of the device which is connected. A method mixing these two approaches can be particularly effective both to reduce the volume of information to be transmitted by the electronic device when it is connected to the intermediary site and thus to reduce the latency time.

In this embodiment, the intermediary site accesses the description of the standard resources of the device implicitly and becomes aware in an explicit manner of the resources optionally added after the purchase of the portable electronic device. For example these can be additional decoders for using digital formats not supported in standard mode and delivered in the form of additional software modules called "plugins". The intermediary site can then send images perfectly adapted to the characteristics of the device. If these are portable devices which are generally equipped with small size screens, the adaptation of the images to the size of the screen makes it possible to limit the quantity of information transmitted to that which is strictly necessary. The limitation of the quantity of information transmitted is beneficial both in terms of size of the infrastructures of the intermediary site and improvement in the ease of browsing providing shorter response times, all things being equal.

According to a more sophisticated embodiment, the adaptation of the intermediary site to the means for reproduction and browsing/selection can extend as far as detecting the connection of the portable electronic device to an external display device of larger dimensions such as a television or a video projector and may consequently adapt both in terms of the image and the browsing means relying, for example, on the use of a remote control.

In a yet further developed embodiment of the intermediary site, it is possible to use portable electronic devices not having embedded browsing software and possibly offering only relatively rudimentary browsing and selection means. The solution then consists in browsing in a textual list and/or inside still frames transmitted by the intermediary site in the form of compressed image files, for example according to current standards such as PNG, JPEG, PDF etc.

In order to reduce the response time during browsing and to allow the user's browsing/selection actions to be anticipated, advantageously it will be chosen to transfer the content of the screens a whole page at a time with a display with progressive resolution. Advantageously this choice of implementation will be completed by stopping during the transfer of a page once an action by the user on a browsing/selection command is detected.

This variant embodiment of the invention can also advantageously be complimented by commands for browsing by page. Thus the user can efficiently browse in the space of the pages of offers by means of dedicated keys then he can secondly browse through the objects offered in these pages, and if appropriate make a selection, using the browsing/selection means, object by object or with standard pointers. Nevertheless the scope of the invention is not exceeded by combining totally or partly the different embodiments for the browsing/selection.

Simple devices equipped with a keyboard having dedicated browsing and selection keys can then be used under excellent conditions despite their intrinsic limitations.

An additional refinement can be added in the case of devices equipped with a simple keyboard advantageously placed at the screen border. This involves the addition to the image sent by the intermediary site of a pop-up window visually indicating the keys of the keyboard reassigned to the browsing and to the selection with their new meaning. The visual pop-up window of the image of all or part of the keyboard can be made realistic by respecting the shape and the location of the keys.

This is made possible by the knowledge which the intermediary site has of the characteristics of the connected device. This variant makes it possible to use the method according to the invention under acceptable conditions using inexpensive portable electronic products having very limited resources. The pop-up window of the image of all or part of the keyboard in the image to be displayed received from the intermediary site can also be produced within the portable electronic device without exceeding the scope of the invention.

After being connected to the intermediary site by a direct access command, such as a dedicated physical button or a specific icon, a first screen content containing offers and or information is displayed (a connection means). This first screen content can offer a preliminary choice among a plurality of merchants and/or the choice among a plurality of categories or items. It can also include a search function associated to a field in which the user can enter a brand, a merchant, an item, a category of items. Advantageously the screen can include special offers some/all of them can provide a direct link to the corresponding page. The screen can also include any type of advertising for example, texts but also access to video clips, video trailers, audio messages or any other advertising contents.

Within a screen, the choice of a merchant can be through the proposed by displaying a plurality of logos representative of these signs, the selection of which leads the corresponding merchant site arriving on the home page.

The preliminary choice can also take place in the space of the possible goods and/or services, the choice of the merchant site being able to take place further downstream after having defined in a precise or approximate manner the sought object. Advantageously, the shift from the space of the offers to the space of the supplier sites can take place at any time in a contextual dependence relationship undertaken by the intermediary site. At each stage of a choice of object in order to more precisely focus on it, the switch to the display of the suppliers proposes only the sites relating to the category of objects selected. In a yet further developed embodiment, the intermediary site relates the request with the state of the stocks of the suppliers concerned so as to finally propose only the merchant sites which are able to deliver the objects or the groups of objects concerned. When the object is chosen, the intermediary site can also offer a service automatically classifying the merchant sites concerned in ascending order of the prices proposed or according to any other criterion such as for example by a positioning of the merchant site depending on the price that it has paid for its referencing.

It is also possible to offer a mixed method in which objects and suppliers are presented for the user's choice in the same screens.

According to the preferred embodiment, the first screen proposes a first selection by category of objects and/or services then offers the choice of the signs concerned for each category selected.

When the choice of the number of objects proposed exceeds a certain threshold, it is more effective as regards the ergonomics to shift to a selection method from a textual tree and branch list in which the articles are advantageously filed in alphabetical order. Once the choice only relates to a limited number of articles it is then advantageous to switch to a selection method for objects presented in the form of still frames or moving images.

When an object is selected from a plurality it is possible to enter automatically or on explicit request into a so-called detailed mode in which the object is presented alone with additional elements of information. This may be additional textual information, in the form of still frames, moving or video images or also spoken information. The act of purchasing is possible as soon as an object can be selected. The scope of the invention is not however exceeded if the possibility of carrying out the act of purchasing depends on certain preliminary actions or is possible only at certain stages of the presentation of the choices. The pressing of a key or the designation of a specific icon makes it possible to realize the act of purchase using the information known to the intermediary site.

In its preferred embodiment, the invention also incorporates an engine for searching by item in the space of the merchant sites proposed.

In addition to the offers made to the users in the space of the suppliers or in that of the goods and services, the invention envisages the possibility of incorporating into all or part of the screens, display areas with or without possibilities for selection dedicated to information of the advertising or promotional type.

It can be undesirable to confine the user to an offer limited to partner merchant sites. The invention offers an advantageous means for remedying this limitation by running browsing software on the Internet/www within the intermediary site, this software being remotely operated from the portable electronic device. This solution is particularly well suited to portable electronic devices which have limited resources which do not allow browsing software to be run. As described previously, the intermediary site sends compressed image files to the portable electronic device which are representations of the screens originating from the browser application. These images are adapted to the display capacities of the portable device. In an upload direction, the portable electronic device sends the browsing commands from the user to the browsing application embedded in the intermediary site. Thus the user can browse without restriction on the Internet/www. Filters removing all the additional animation or video elements not being able to be run by the portable electronic device can advantageously be used in order to reinforce the effectiveness of the method.

Advantageously, the intermediary site, selectively manages the proposed offer of information and/or digital objects (<<pull>> mode) to the portable electronic devices. This may mean for example proposing for the user's choice only the digital objects that he is able to use in the portable electronic device with knowledge of the resources available for decoding and/or for decrypting the content if appropriate. Still using the knowledge of the resources of the portable device in the intermediary site, it is possible to propose in one way the objects which can be used directly and in the other, for example in greyed out display, the objects which could be used by acquiring additional software and/or a material component. The selection of an object presented in another way advantageously generates the appearance of an appropriate information message and/or the offer of a direct connection to the corresponding page of a merchant site in order to acquire the missing component. Moreover, the selective nature of the offer can be the result of the exploitation of information, preferably by the client. The numerous preferred criteria and the numerous combinations between these criteria can be based on choices or explicit declarations by the client, for example at the time of recording the initial profile when the account is created or also subsequently by accessing the appropriate means of the intermediary site. In the particular case of the purchases of film, musical or literary works, the preferred criteria can be for example the genre, the author, the years, the themes. The invention also envisages an implicit management of the preferences based on the knowledge by the intermediary site of information about the client, such as for example the age, gender, place of residence and about the history of his purchases. The intermediary site can also take into account other personal information such as his birthday, saint's day, birthdays of his other half or children or also general information of the event or cultural type such as for example Valentine's Day. These non-limitative examples can be used alone or in all forms of combinations in order to propose an offer suited to the potential client and thus to maximize the chances of proceeding to the act of purchase.

In addition, the said "pulled" information may concern the collect, of data generated inside the devices, by the intermediary site. These data may represent statistics, metering of the use of the resources, functions and/or services. This information may also concern statistic about buying, including vendor's name, bought items, quantities and prices. It can concern also information about browsing, voluntary ranking made by the user among identified material and/or immaterial objects. Some information about preferences and/or ranking can be indirectly obtained by monitoring for example the number of time an identified object is played. Depending on local laws and/or constrains about privacy/confidentiality, the collect of this type of information can be limited, controlled and/or may need an explicit acceptation from the end user.

It is also envisaged that the intermediary site according to the invention broadcasts information in "push" mode into the portable electronic devices in a substantially specific manner as a function of all or part of the information associated with the client available in the database. The said information can be of any type, for example date and/or time information in order to set the real time clock embedded in the device and to synchronize it with system time. The information can also represent pieces of software of any type, embedded firmware, applicative software, plug-ins and/or macro-language scripts for existing software, parameters that determine part or all of the device behaviour, right or refusal to access to part or all identified services. Of course the "pushed" information can be also digital contents that can represent text, still or animated picture(s), video, audio or any combination of such categories. The substantially selective broadcasting of information by the intermediary site to the portable electronic devices can be carried out by using all, part or none of the user's choice. Thus it is envisaged to be able to propose to the user to select lists for broadcasting depending on criteria specific to him relating for example to the nature of the content and/or the frequency of the transmissions. It is also possible to control the level of pre-emption of the content transmitted and its use in portable electronic devices. This control of the broadcasting which is managed by the intermediary site can be subject completely or in part to the choice of the final user. This choice can be made or be modified using the portable electronic device or can require a connection from a third piece of equipment such as a computer. That which is described above in relation to the use of the information preferably in the case where it is the client's initiative to consult the offers is also possible in the advanced broadcast mode in which the initiative for the offers relies on the intermediary site.

The so-called advanced broadcast mode via the intermediary site can relate to advertisements, promotional offers associated or not with discount coupons provided by a displayed code or by a function controlling the transfer of an electronic ticket. It can also involve downloading of digital objects the optionally associated rights for which can advantageously allow a use similar to a use as a sample. It can for example be downloading of newspapers combining texts and fixed images or also multimedia newspapers combining writing, fixed and/or moving images, sound and/or video, it can also be extracts of videos or films or also of these works downloaded in their entirety. A work entirely downloaded into the memory of the device can be displayed free of charge in the sample mode and be able to be displayed in full after having bought the right to display it.

The exploitation of the capacities of the intermediary site according to the invention to transmit information in advanced mode constitutes an alternative and/or an advantageous complement to so-called "podcasting" solutions in that this reduces the complexity for the user who no longer has to search for and record syndication feeds in his device and for the portable electronic device which does not have to manage them. Moreover, potential additional value is created in the intermediary site by taking into account information associated with the clients and by the possibilities of incorporating content which go beyond the usual offers of Internet agents.

The invention envisages the management of the wishes of potential clients in particular a list of objects which are not yet available that generates a notification in response when the object becomes available. This information can be made known to the client at his own initiative (<<pull>> mode) when he consults the corresponding page or pages of the intermediary site. The intermediary site can also manage this information in advanced broadcast mode by allowing the notification of availability to reach the client by any available means which the latter has previously selected. For this purpose the intermediary site can use his means of communication with the portable electronic device or use means outside of the system according to the invention such as for example the sending of an SMS or a voice message to a portable telephone. The invention also envisages offering the client the possibility of reserving, for a determined period of time, a previously unavailable object which becomes available or also the pre-purchase of this object or also the auction of objects the rarity of which is genuine or contrived. Other techniques for creating a wish are provided in the advanced and/or pull mode such as for example the notification of new items, and "agents" for intelligent searches which can be activated by turns or permanently.

The invention undertakes the management of the updates of all or part of the software embedded in the portable electronic devices. Thus it is possible for the intermediary site to propose or to impose updates according to whether these are optional, free or not, functional additions like plug-ins or whether these update are necessary to fix bugs, to respond to an infrastructure problem for example concerning security or more generally to be compatible with new essential procedures.

The invention can advantageously include in the portable electronic device means for informing the intermediary site that the device is connected. This information can also take into account the fact that the user is using or not using the communication capacities of the portable device for example periodically sending information about the non-use of the communication capacities and/or by automatically informing the intermediary site of the fact that the user is exploiting the communication capacities of his portable electronic device prior to any request for connection on his part. It is also advantageous to detect the fact that the portable electronic device is connected or not to a supply source connected to the electric network and to communicate this information to the intermediary site. This information is particularly useful for example for authorizing or not authorizing transfers of large files or a plurality of files in sessions which can mobilize the resources of the portable electronic device for periods which can exceed the capacity of the autonomous supply means of the device. The principal objective of these optional refinements of the invention is to maximize the performance realized by the portable electronic devices by giving priority in the allocation of resources and in particular the bandwidth of the communication channel to all the uses which can effect the quality of service obtained by the user.

According to yet another feature of the invention, a means for reading a card including a chip, belonging for example to smart card or memory card categories, with or without contacts, allows the portable electronic device to make purchases by debiting directly from a pre-registered open credit account or a top-up account when the corresponding card is presented to the device.

Prepaid cards can also be used without exceeding the scope of the invention. Prepaid cards are particularly suitable for on-line purchases of musical and audiovisual content.

Advantageously a chip card can determine the method of payment associated with the transactions but can also orientate the connection, exclusively or not, towards the offer or offers of associated goods or services or also towards one or more specific signs.

The device according to the invention can also advantageously include means for using a chip card for the identification of the subscriber to a service such as for example a SIM card. It is also possible to include means for using chip cards designed for the storage of content, for example flash memory cards according to the state of the art integrating intrinsic protection mechanisms such as the SD and Micro SD standards or other types of non-integrating cards such as MMCs. Of course, the scope of the invention is not exceeded if a plurality of internal and/or external means are simultaneously implemented in order to exploit several types of chip cards within said portable electronic device.

According to a feature of the invention relating specifically to obtaining downloadable digital content, the system implements solutions for management of the licenses associated with the management of the associated rights. In the preferred embodiment, the portable electronic device sends to the intermediary site a request associated with at least one unique identification element. This request can be directly associated with a unique element for certification of the portable electronic device vis-à-vis mechanisms for authorization of use of the protected content. It is however advantageous to store the certification elements associated with a client account in the database of the intermediary site. This in particular makes it possible to dissociate the identification of the portable electronic device, by which means a downloadable object is ordered, and that of the portable electronic device or devices receiving the download. This disassociation in particular makes it possible to choose with the order one or more recipient devices which may not include the device through which the order is given.

Numerous solutions exist for managing the rights associated with digital works. These can be specialized solutions which satisfy specific requirements for example solutions suited to the protection of content according to their nature for example written, musical or video or also according to the method of distribution such as broadcast, transferred in the form of storable files or also transferred as temporary streaming files. Different standards exist in each of these categories which are recommended by different agents.

Moreover, portable electronic devices, the resources of which are limited, can use a single or a few of the mechanisms for protection of the possible rights. The intermediary site according to the invention can advantageously implement means for conversion of the protection mechanisms in order to allow the use of any content on any portable electronic device. This result can be achieved in many ways, for example by transcoding the information to be delivered in such a way that it is suited to the decryption resources of the recipient device. The following non-limitative examples are more advantageous in that they require no storage of content within the intermediary site: the intermediary site informs the merchant site of the protection mechanism or mechanisms embedded in the recipient device so that the corresponding version of the digital object is delivered directly to it by downloading into the recipient device the program for management of the rights corresponding to the work to be delivered, etc.

The scope of the invention is not exceeded in the case of a separate management of the rights and the content. For example it is possible to acquire a protected content via all transmission means, for example via communication means or using any physical information support, then to buy one or more user licenses, or also to acquire a free licence if appropriate, using the system according to the invention.

The implementation of the invention makes it possible to potentially offer all the methods of sale usually proposed by physical or on-line distribution channels such as the following non-limitative examples:
rental with payment per object for a determined number of immediate or deferred uses, on means which are optionally specified by type and number,
sale for an undetermined period,
sale of prepaid gift vouchers
rental with deferred payment
undertaking promotional offers of different types including gift vouchers, exchange or discount vouchers in all forms (code to be entered, object to be designated on the screen, etc.)
the management of subscription to the service in an all inclusive deal or not The transaction method and system according to the invention can have applications in the following fields:
for the on-line sale or rental of immaterial objects including music, video-on-demand, written, read or played works, written works in textual form with or without images or also software,
for the on-line sale or rental of all types of material objects including accessories for portable electronic devices,
for the sale or rental of any material or immaterial goods by means of advertisements illustrated by photos or videos,
for the on-line sale of holidays illustrated by photos or videos.

DETAILED DESCRIPTION OF THE DRAWINGS

Other advantages and characteristics of the invention will become apparent on examination of the detailed description of an embodiment which is in no way limitative, and of the attached drawings in which:
A system according to the invention comprises, with reference to FIG. 1, at least one partner merchant site 2, the intermediary site 13 and a plurality of portable electronic devices 7, 10, all of these resources being connected to the Internet/www network 1.

The portable electronic devices 7, 10 are connected to the Internet 1 via wireless means, for example via Wifi, Wimax, UMTS or also using gateways 6, 12 respectively defining public wireless sub-networks, respectively <<hot spot>>, «hot zone» or cells 8 or domestic networks 9. Typically the gateway function for a domestic network can be for example an ADSL modem/router with Wifi capability 12 or also it can be a PC connected to the Internet by any type of connection and equipped with a Wifi access point. The portable electronic devices 16 can also be connected to the communication network via hard-wired means such as for example by means of a USB connection using a gateway or a computer. Advantageously, the implementation of the invention does not necessarily require the presence of a computer if other Internet connection means are available.

The architecture illustrated in FIG. 1 shows the three main components of the system connected to the Internet/www network namely the intermediary site according to the invention 13, the plurality of partner merchant sites 2, the portable electronic devices by means of which the offers are looked up and the purchases made 8, 9. The two main types of networks allowing the wireless connection of the portable electronic devices are illustrated in 8 and 9, respectively using a point of access to an infrastructure network and using a point of access to a domestic network.

Figure 2:
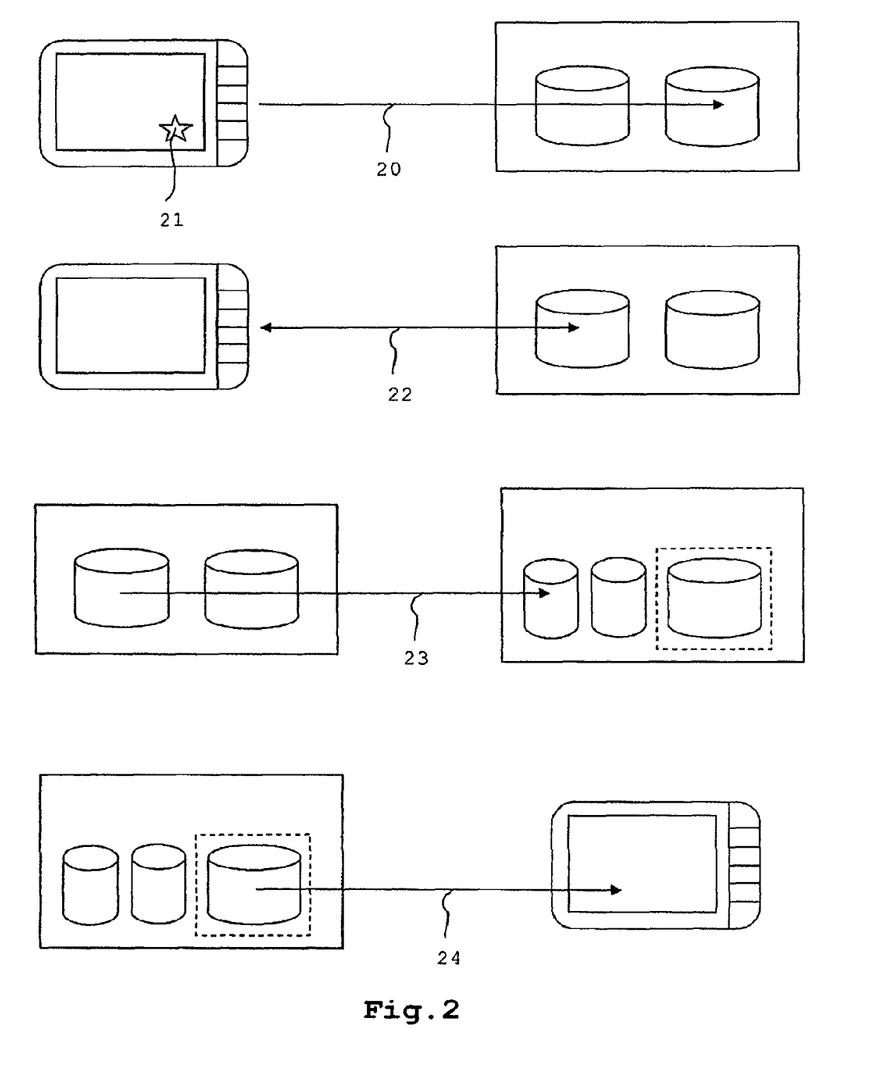
FIG. 2 illustrates the stages of the method according to the invention.

With reference to FIG. 2, in the initial stage 20, the portable electronic device is connected, for example by selection of a dedicated icon 21, to said intermediary site and identifies itself.

In stage 22, the user browses in the space of the internal offers and/or the offers of the partner merchant sites. The offers are presented to the portable electronic device by the intermediary site in a format suited to the characteristics of the device. The offers can either be hosted by the intermediary site, be hosted by a supplier site and pass through the intermediary site or be directly sent by the supplier site to the portable electronic device. It is also possible to switch from one hosting mode to the other during browsing in the space of the offers without exceeding the scope of the invention. The user selects objects if appropriate. When it is digital content for example audio or video, it is also possible to offer free extracts without exceeding the scope of the invention.

In stage 23 the user goes to the checkout of the merchant site or sites concerned or also to the virtual «central checkout» of the intermediary site if appropriate in order to confirm his purchases. If the client account does not exist, a procedure for creating the account is proposed using secure means in particular in order to enter the account number or bank card number. This procedure can be avoided by the use of specific chip cards.

Stage 24 is the delivery of the goods or services purchased. The drawing represents the particular case of the delivery of an audio or video content intended to be used on an electronic device, possibly on the one which was used for the purchase but it can be another device without exceeding the scope of the invention.

Figure 3:
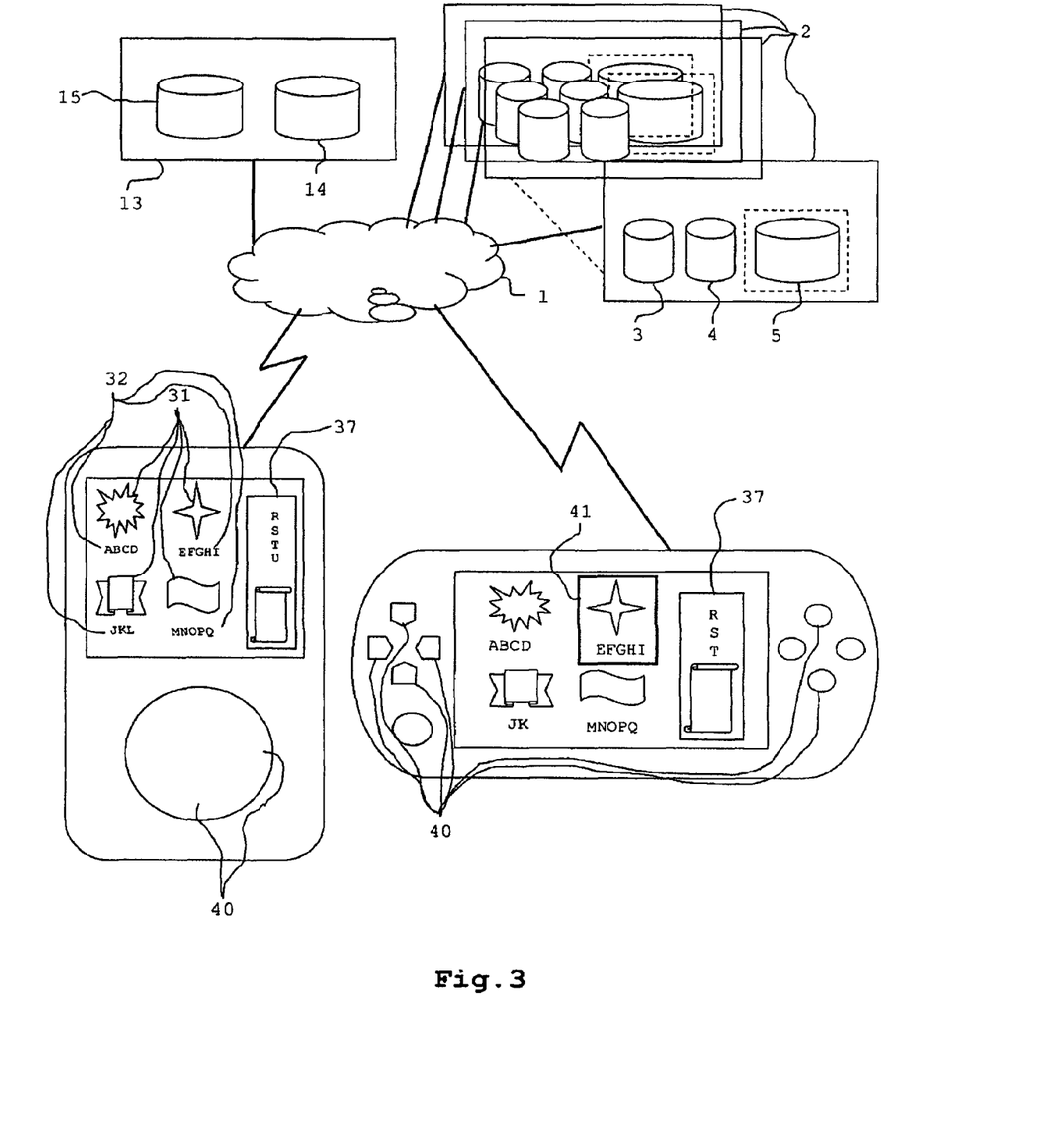
FIG. 3 principally illustrates an example of an offer on the portable electronic device.

Whatever the selection made between priority of the sign or priority of the object, the choices can be presented to the user as illustrated in FIG. 3.

This screen can for example contain images 31 representing the objects proposed, optionally with an associated description 32. The screen can also contain information areas 37 for example advertising information, these areas being selectable or not. The image is constructed by the intermediary site according to the invention taking account of the characteristics of the display means. Selection of the objects proposed and/or browsing in the space of the possible choices can advantageously take place by means of a touch screen. As illustrated in the example of FIG. 3, simple portable electronic devices without a touch screen can nevertheless be used and offer acceptable ergonomics. The simplest browsing method adapted to such reduced means is based on an exploration of the screen using the directional controls for moving the pointing means. A graphical pointer can be moved on the surface of the screen and a validation means such as a specific key makes it possible to choose the object on the surface of which the pointer is located. In an even simpler manner, the pointing is carried out object by object 31, 32 by means of the available controls 40. The object pointed at is indicated by a frame 41, an expansion, a change of colour or any other graphical means allowing it to be distinguished from the other objects present on the screen. The example proposed offers controls for browsing in the space of the choices of the same type 33, controls for changing level in the hierarchy of the possible choices 35 and keys for direct selection 34 of the objects presented by reproducing their associated image in miniature. Given the relatively small size of portable electronic devices, it may be necessary to reduce the space of the possible choices by means of a stage of pre-selection from a textual tree diagram. Additional information 37 for advertising, promotional or information purposes can be displayed. This information can depend or not on the context of the choices presented to the user, it can be the subject or not of a possibility of selection without exceeding the scope of the invention.

Figure 4:
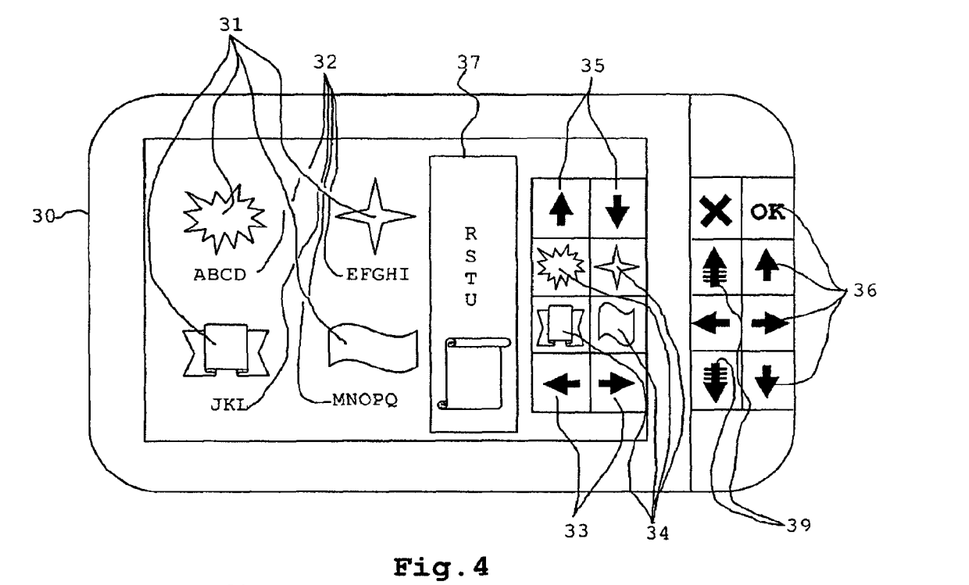
FIG. 4 principally illustrates an example of an offer on the portable electronic device.

FIG. 4 illustrates an additional refinement of the invention which can be advantageously used in simple portable electronic devices not having a web browser or a touch screen.

As in the previous example, the screen contains images 31 representing the objects proposed with optionally an associated description 32. The screen can also contain information areas for example advertising information, these areas being selectable or not. The image was constructed by the intermediary site according to the invention taking account of the characteristics of the display means. In the absence of dedicated selection and/or browsing controls, it is particularly advantageous to include in the displayed image a visual representation of the control means of the device including the new associated functions. This reassignment of the meaning of the controls can relate to all or part of the buttons of the keyboard in accordance with the context in order to allow an intuitive use. This non-limitative example illustrates this principle in which keys 36 with two contacts are given the new meanings indicated in the representation 33, 34, 35. Thus it is possible to come close to the simplicity of use of a touch screen with less costly means. The example proposed offers controls for browsing in the space of the choices of the same sort 33, controls for changing the level in the hierarchy of the possible choices 35 and keys for direct selection 34 of the objects presented by reproducing their associated image in miniature. Given the relatively small size of the portable electronic devices, it can be necessary to reduce the space of the possible choices by means of a stage of pre-selection from a textual tree diagram. Additional information 37 for advertising, promotional or information purposes can be displayed. This information can depend or not on the context of the choices presented to the user, it can be the subject or not of a possibility of selection without exceeding the scope of the invention.

FIG. 4 also illustrates another variant embodiment for a particularly effective browsing using the presence of control means dedicated to the browsing by pages 39 which compliment the traditional browsing/selection means 40 within a page. In this embodiment, the graphical elements 33, 34, 35 for reassignment of the controls no longer need to be displayed which frees up the whole of the surface of the display which can be used for the presentation of content. The ergonomics is also improved by the systematic character of the meaning of the browsing/selection control means which can advantageously keep the same meaning in the other applications used in the portable electronic device if appropriate.

Figure 5:
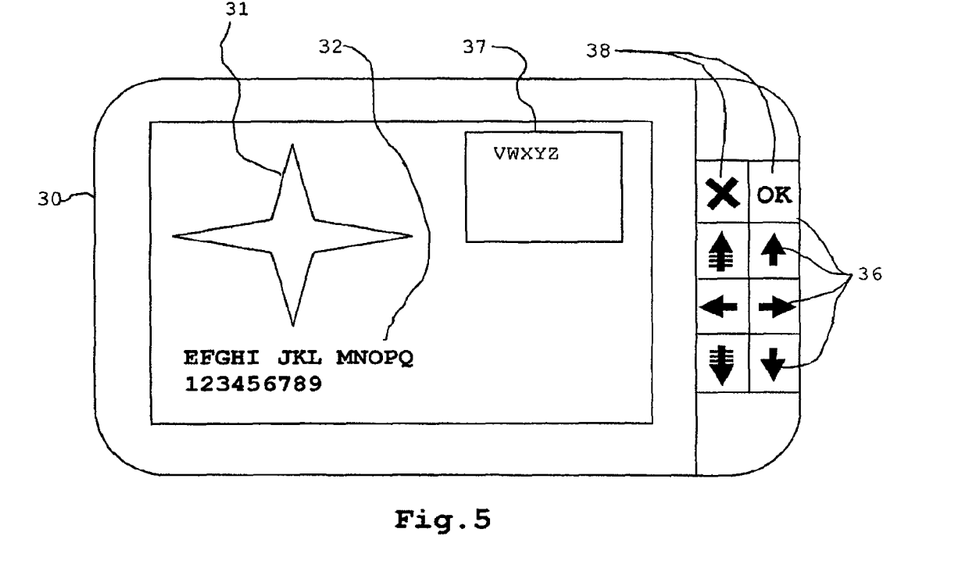
FIG. 5 principally illustrates an example of an offer limited to a single object in a tree and branch network choice as introduced in the example of FIG. 3 on the portable electronic device.

FIG. 5 mainly illustrates an example of an offer limited to a single object from a tree diagram selection as introduced by the example of FIG. 3 on the portable electronic device. This example illustrates what could be displayed after having selected the object described by the text <<EFGHI>> in the example of FIG. 3. From this level in the tree diagram of the selection, the display and selection means are dedicated to a single pre-selected object. This stage is the opportunity to provide for example additional associated descriptive information and associated quantitative information such as prices, availability, etc. If the choice offered to the user is simply the acceptance or refusal of the object proposed then standard keys 38 can be appropriate. Additional information 37 for advertising, promotional or information purposes can be displayed without exceeding the scope of the invention. This information can depend or not on the context of the choices presented to the user, it can be the subject or not of a possibility of selection.

Figure 6:
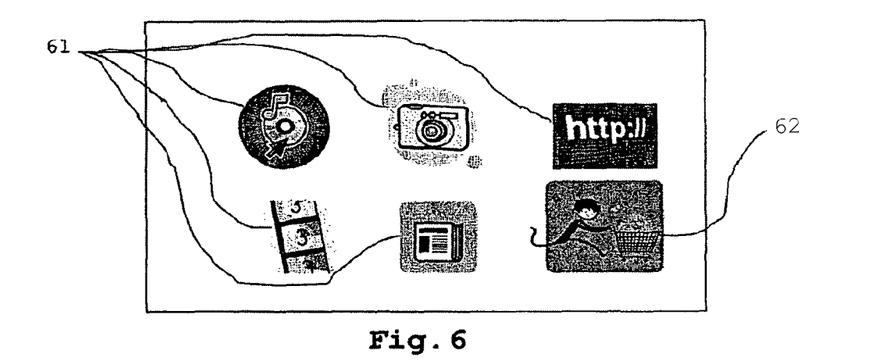
FIG. 6 illustrates an example of display of a first screen of a portable electronic device.

FIG. 6 illustrates an example of the display of a first screen of a portable electronic device in which a plurality of functionalities 61 is proposed. It may be, as illustrated, playing music, viewing photos or videos, reading electronic books or also browsing on the Internet. Among these functionalities, a direct access 62 to means implementing the method is proposed in order to carry out transactions according to the invention.

Figure 7:
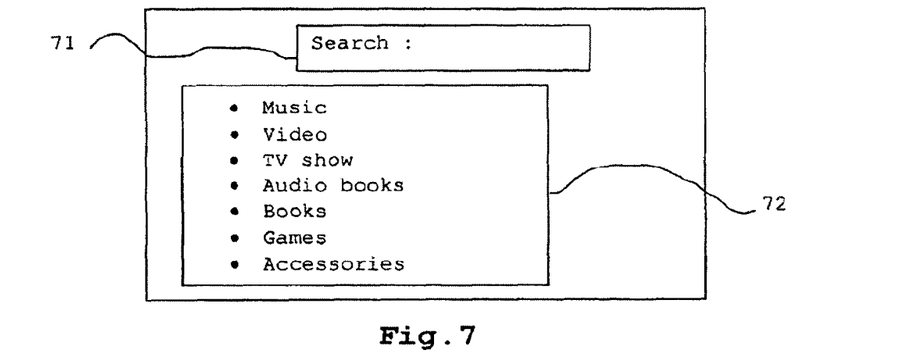
FIG. 7 illustrates an example of display of a second screen which appears when it is selected to call up the implementation of the method according to the invention. Product and/or service names etc.

FIG. 7 illustrates an example of the display of a second screen which appears when it is chosen to call up the implementation of the method according to the invention. This example involves proposing categories 72 of products or services such as music, video, television shows, audio books, books in textual format, games and accessories. This screen also proposes a service for searching 71 using a name of a product or category of products, of a service or category of services, of a brand, of a provider/merchant . . . .

Figure 8:
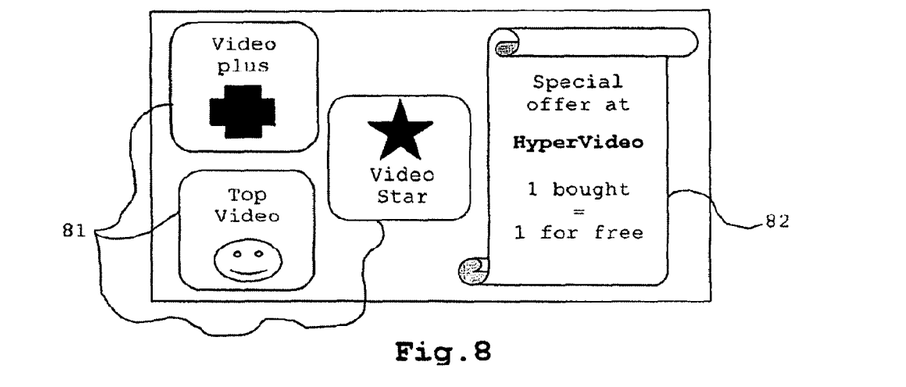
FIG. 8 illustrates an example of display of a third screen which proposes a plurality of merchant sites relating to the category chosen in the previous screen.

FIG. 8 illustrates an example of the display of a third screen which proposes a plurality of merchant sites 81 relating to the category chosen in the previous screen, here "video" and a promotional offer 82 which is distinguished from the standard offers 81 by characteristics or visual effects relating for example to the size, the colour, the animation and/or by sound effects when the object is selected. The selection of a merchant site or a promotional offer in this screen causes the home page of the site concerned to be called up. Promotional offers can be directly linked, indirectly linked or not be linked to the category of objects proposed.

It should be noted that this stage can be followed or not by other stages without exceeding the scope of the invention. For example the selection of a quantity for this object, the return to another choice, the selection of a supplier or an equivalent object, the progression to the conclusion of the transaction or its abandonment, etc., can be proposed.

Figure 9:
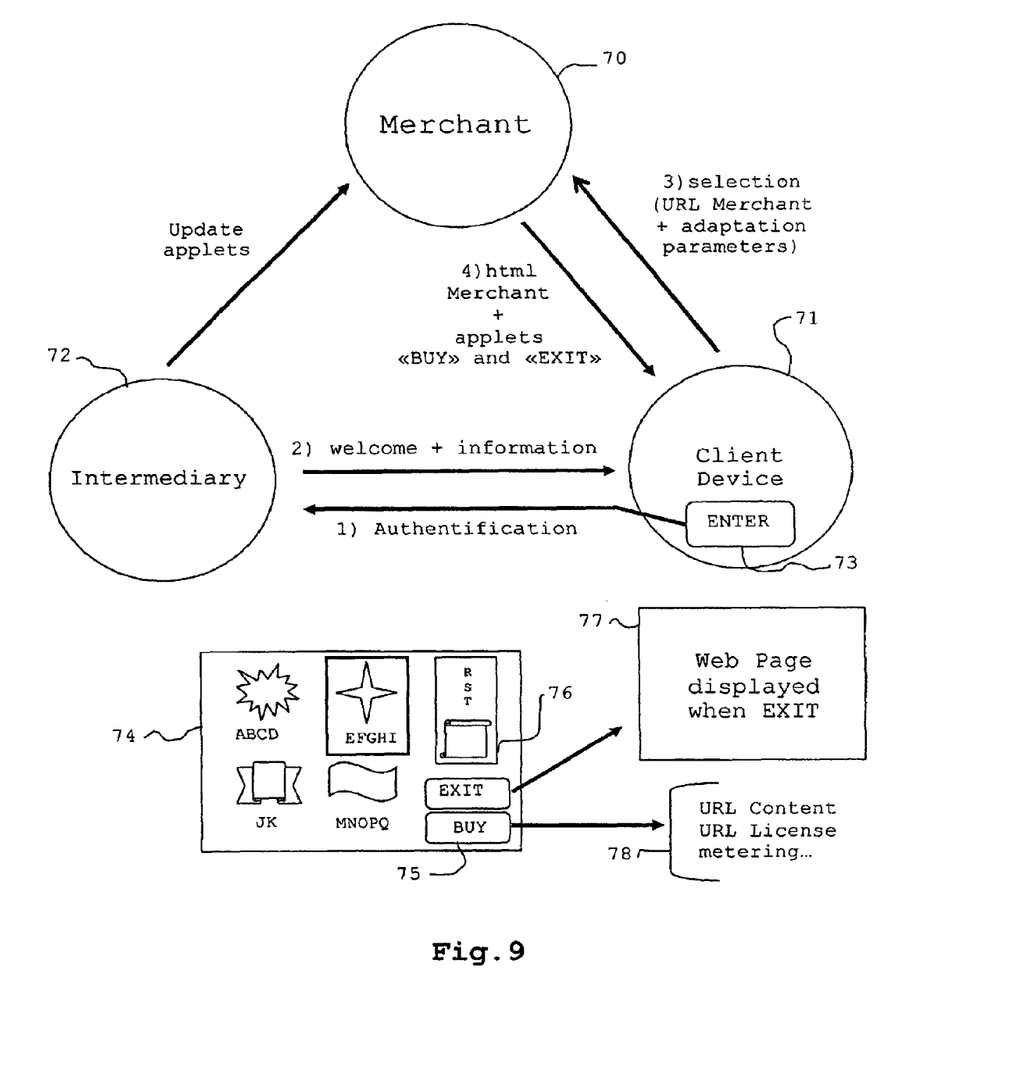
FIG. 9 illustrates a particularly effective example of architecture and exchanges of information according to the invention between the portable electronic device, the intermediary site and a representative merchant site.

FIG. 9 illustrates a particularly effective example of architecture and exchanges of information according to the invention between the portable electronic device 71, the intermediary site 72 and a representative merchant site 70.

In this implementation of the invention, the intermediary site is used as an indirect adapter. Thus, after initial communication(s) between the client device and the intermediary site and/or the concerned merchant site in order to transmit at least the adaptation parameters and/or some programmatic objects, the adaptation of the pages to be sent by the merchant site during further browsing on the client device, is done directly by the merchant site itself.

In this example, the adaptation is done asynchronously by first authentifying the client device by a first communication from the client device to the intermediary site. This first communication is triggered by a request from the user through a dedicated command 73, for example through the selection of a specific graphic and/or textual item in a graphic and/or textual user interface. This first communication with the intermediary site can be invisible for the user that looks only for a connection to one or to a plurality of merchant sites. In the given example, the second step is the answer from the intermediary site 72 to the mobile device 71. Typically, the answer includes some information to be partly or entirely used by the client device 71 in the next step.

The following step proposed in the given example is the request for a connection by the client device to the dedicated merchant site or to the selected merchant site in a list of proposed merchant sites. This connection request includes additional information, like for example, the URL of the merchant site, some parameters dedicated to the adaptation of the following pages to the resources the client terminal 71. The said additional information may also include login data and/or any other kind of passport.

The fourth step in this example is the adapted answer coming from the merchant site. This answer may include some additional information like applets or any other type of programmatic object like scripts or macro functions to be executed by the portable device. The goal of this additional information is to allow the user to buy/rent a good or a service or exit from the shop with a simple and direct action in a way that copes with the requirement of each merchant site. In this non-limitative example, the programmatic objects to be executed by the client devices are stored in a dedicated database in the intermediary site for convenience purpose. Of course it changes nothing if this information is delivered to the merchant sites in another way. For example through a dedicated FTP site under mobile device manufacturer control, the programmatic objects can also be sent directly to the merchant site by the concerned manufacturer, it may use a RSS link to automatically update merchant site dedicated database.

Other implementation options can be achieved, for example the order of the different steps of the method can be changed, and some additional information can be sent separately.

Of course, the invention is not limited to the examples which have just been described and numerous adjustments can be made to these examples without exceeding the scope of the invention. Moreover, the examples of solutions or technical standards mentioned are those which are current at the time of filing the patent application. They may disappear or be rapidly replaced by others without however rendering the invention itself obsolete. The invention is described and illustrated with reference to merchant sites but its scope is not exceeded if it applies to sites supplying material or immaterial products and/or services in a non-commercial context or also in a context combining commercial and non-commercial offers.

What is claimed is:
1. A method for making transactions, comprising:
 supplying, from at least one web site, at least one of products and services through a plurality of portable electronic devices which can be connected to a communication network by communication means;
 controlling, by each of the portable electronic devices, internal or external displaying, browsing and selection resources hereinafter called "controlled resources";
 connecting a portable electronic device among the plu- rality of portable electronic devices to an intermediary site via the communication network;

connecting the intermediary site to the at least one products and services supplying site;

adapting, in the intermediary site, information provided by the at least one products and services supplying site, in a format adapted to the controlled resources for the portable electronic device;

transmitting the adapted information directly or through the intermediary site to the portable electronic device; and directly connecting the portable electronic device among the plurality of portable electronic devices to the at least one site supplying products and services without passing through the intermediary site for financial transactions, the at least one site supplying products and services being responsible for its own financial transactions.

2. The method according to claim 1, further comprising a detection of a possible connection of the portable electronic device to an external display device, and a use of this detection in order to adapt the information transmitted to the portable electronic device.

3. The method according to claim 1, further comprising provision to the portable electronic device of images which can be used as an information support and as a browsing and selection menu.

4. The method according to claim 3, further comprising an addition of visual selection elements to a menu image transmitted to the portable electronic device.

5. The method according to claim 1, further comprising sending to a portable electronic device of suitable images representing screens produced by a browsing application run on the intermediary site and remotely controlled from the portable electronic device.

6. The method according to claim 1, further comprising a selective offer ("pull" mode) of information and of digital objects intended for one or more portable electronic devices.

7. The method according to claim 1, further comprising a selective broadcasting ("push" mode) of information and of digital objects intended for one or more portable electronic devices.

8. The method according to claim 1, further comprising a selective broadcasting of programs or one or more software components intended to be embedded in one or more portable electronic devices.

9. The method according to claim 1, further comprising communication by the intermediary site to the supplier site of data relating to a client, prior to the sending of content adapted to the portable electronic device.

10. The method according to claim 1, further comprising communication by the intermediary site to the supplier site of data relating to the client, during one of the concluding stages of the financial transactions.

11. The method according to claim 1, further comprising a recording on the intermediary site of an address of the portable electronic device in a communication network.

12. The method according to claim 1, further comprising a recording on the intermediary site of at least one unique item of identification data characteristic of the portable electronic device.

13. The method according to claim 12, used for the acquisition of a protected digital object from a site supplying products and services.

14. The method according to claim 13, further comprising a transfer of a license for use of the protected digital object from a site managing the rights to the portable electronic device or another platform receiving the protected digital object.

15. The method according to claim 14, further comprising:
a transfer of a license for use of the protected digital object from a site managing the rights to the intermediary site,
a transfer of the license of use from the intermediary site to the portable electronic device or another platform receiving the protected digital object.

16. The method according to claim 13, further comprising a use of identification data associated with the portable electronic device, for marking of files with content acquired by a client, in particular by digital watermarking or fingerprinting.

17. The method according to claim 13, in which digital objects provided via the intermediary site are intended for a direct use with or without long-term storage in the portable electronic device.

18. The method according to claim 13, further comprising a conversion of a protection mechanism associated with a protected digital object delivered by a site supplying a service, in order to allow the use of the protected digital object on a portable electronic device which can be connected to the intermediary site.

19. The method according to claim 13, further comprising a management of an offer proposed to the portable electronic devices which take account of a decoding means and a protection means embedded in the portable electronic device.

20. The method according to claim 1, further comprising an access via the intermediary site to information relating to the controlled resources of the connected portable electronic device, in particular the controlled resources which relate to the display and browsing.

21. The method according to claim 20, characterized in that the information relating to the controlled resources of a portable electronic device are provided in an indirect manner to the intermediary site, in a form of identification data which can be used in a database accessible from the intermediary site.

22. The method according to claim 20, further comprising a recording on the intermediary site of data characteristic of the display capacities of the portable electronic device.

23. The method according to claim 20, further comprising a recording on the intermediary site of data characteristic of the browsing and selection means installed in the portable electronic device.

24. The method according to claim 20, further comprising a recording on the intermediary site of data characteristic of embedded tools for the management of rights to protected digital objects.

25. The method according to claim 1, further comprising a recording on the intermediary site of data relating to a user of the portable electronic device.

26. The method according to claim 1, further comprising a recording on the intermediary site of data relating to a payment procedure carried out by the user of the portable electronic device.

27. The method according to claim 1, further comprising a recording on the intermediary site of the financial transactions made with sites supplying products and services.

28. The method according to claim 1, characterized in that the portable electronic devices send information relating to the financial transactions made to the intermediary site.

29. The method according to claim 1, further comprising an ability to selectively block functions and services associated with a portable electronic device.

30. The method according to claim 29, further comprising a remote unblocking of a portable electronic device previously selectively blocked.

31. The method according to claim 1, further comprising the intermediary site taking responsibility at least partially for financial transactions carried out on the sites supplying products and services on behalf of clients associated with portable electronic devices.

32. The method according to claim 1, further comprising an adaptation of an offer proposed by the intermediary site as a function of an effective throughput of the communication means recorded by the portable electronic device.

33. The method according to claim 1, further comprising on the intermediary site, detection of the connection of a portable electronic device to the communication network.

34. The method according to claim 33, further comprising detection of a connection of a portable electronic device to an electric supply network.

35. A system for making transactions with at least one web site supplying at least one of products and services, comprising:
- a plurality of portable electronic devices which can be connected to a communication network by communication means, each of the portable electronic devices controlling internal or external displaying, browsing and selection resources hereinafter called "controlled resources";
- an intermediary site which can be connected via the communication network to a portable electronic device among the plurality of portable electronic devices,
- the intermediary site connectable to the at least one site supplying products and services to the portable electronic device,
- the intermediary site configured for adapting information provided by the at least one products and services supplying site in a format adapted to the controlled resources for the portable electronic device and transmitted to the portable electronic device, wherein,
- the portable electronic device among the plurality of portable electronic devices is directly connectable to the at least one site supplying products and services without passing through the intermediary site for financial transactions, and
- the at least one site supplying products and services being responsible for its own financial transactions.

36. The system according to claim 35, further comprising, on the intermediary site or related to this site, at least one database, for storing data associated with the portable electronic devices accessing the intermediary site, the stored data pertaining to the controlled resources of the portable device, the controlled resources including the format of a screen of the portable device.

37. A portable electronic device connectable via a communication network to an intermediary site which can itself be connected to at least one web site supplying products and services, the portable electronic device comprising:
- control means for direct connection to the intermediary site via the communication network,
- the portable electronic device controlling internal or external displaying, browsing and selection resources hereinafter called "controlled resources", the portable electronic device being configured for making transactions with the at least one site supplying products and services in which:
- the portable electronic device connects to the intermediary site via the communication network; and
- the portable electronic device receives information provided by the at least one products and services supplying site and adapted, in the intermediary site, in a format adapted to the controlled resources for the portable electronic device,
- the device being directly connectable to the at least one site supplying products and services without passing through the intermediary site for financial transactions, the at least one site supplying products and services being responsible for its own financial transactions, and
- wherein the portable electronic device is connectable via the communication network to the intermediary site, and the intermedia is itself connectable to the at least one web site supplying the products and the services.

38. The device according to claim 37, further functionally integrating internal or external card reader for using at least one card including a chip.

* * * * *